United States Patent Office 3,256,963
Patented June 21, 1966

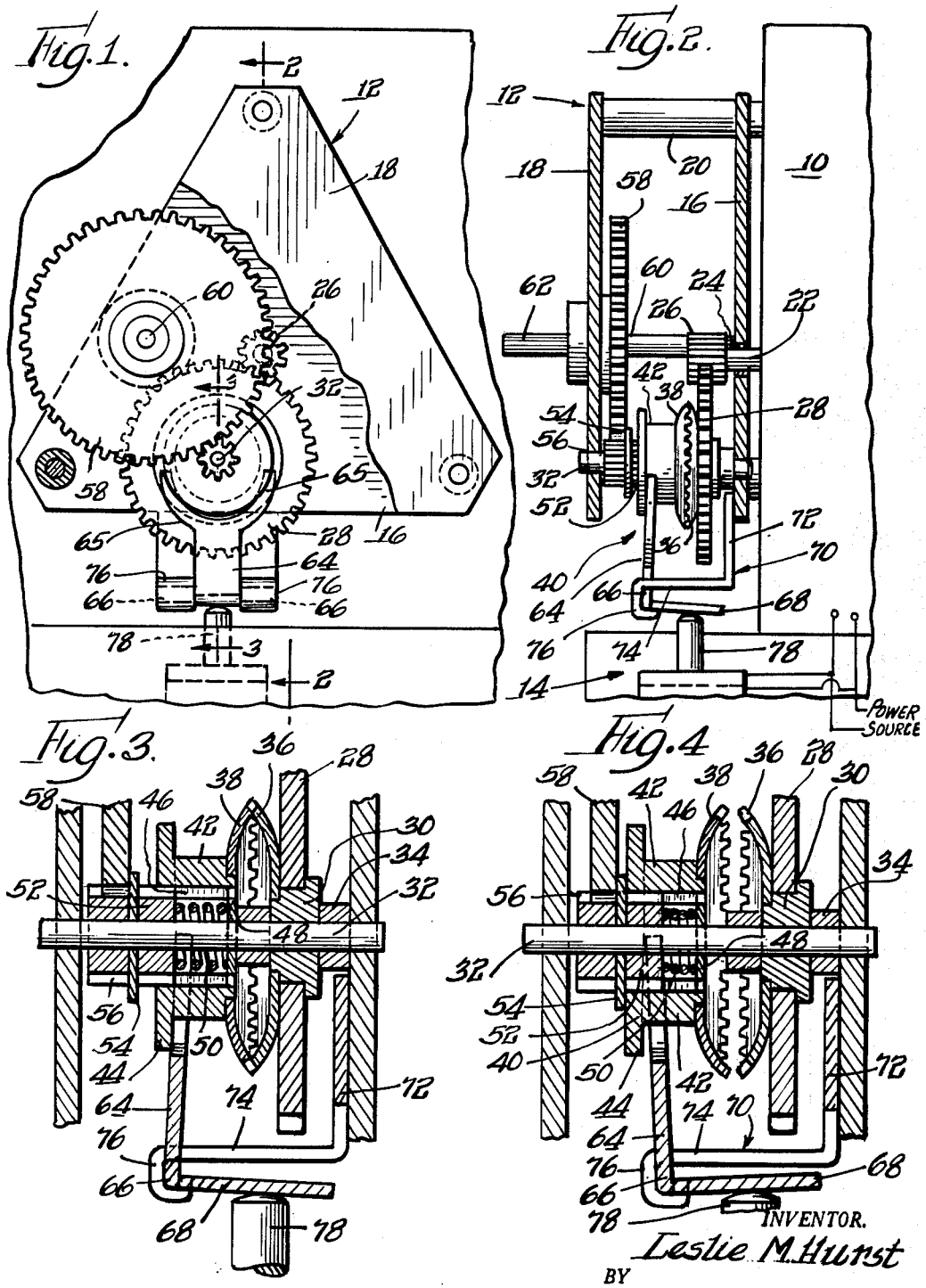

3,256,963
MOTOR CONTROL WITH CLUTCH AND
BRAKE ASSEMBLY
Leslie M. Hurst, Princeton, Ind., assignor to Hurst Mfg.
Corp., a corporation of Indiana
Continuation of application Ser. No. 34,258, June 6, 1960.
This application Mar. 20, 1964, Ser. No. 354,505
4 Claims. (Cl. 192—.072)

This application is a continuation of application Serial No. 34,258, filed June 6, 1960 now abandoned and entitled Clutch.

This invention relates to a novel combination clutch and brake assembly for use with a fractional horsepower electric motor.

Fractional horsepower electric motors are used in many applications requiring the output speed of a fractional horsepower motor to be reduced through a gear train, and, in certain applications, requiring the driven member to stop and start as desired. A simple clutch which connects the motor with the driven device and disconnects it as desired is suitable for some applications; however, in certain application, it is particularly desirable to stop the driven device instantaneously. In these applications, it is not sufficient to simply de-energize the motor because the inertia of the motor rotor continues to drive the driven device after the source of power is cut off, and the inertia of the driven device also requires time to be dissipated. Therefore, it is an object of the present invention to provide a novel clutch and break assembly for use with a fractional horsepower motor in which the clutch mechanically disconnects the motor rotor from a driven device and essentially simultaneously applies to brake to stop the driven device.

It is another object of the hereindisclosed invention to provide an improved combination clutch and brake for use with a fractional horsepower motor which clutch and brake combination may be mounted on the fractional horsepower motor.

A further object of the present invention is to provide a clutch and brake combination which reacts rapidly to actuation, is inexpensive to manufacture, and has a high degree of reliability.

The aforementioned objects of the herein disclosed invention and additional objects will be readily understood and appreciated by those skilled in the art from a further reading of the present disclosure; particularly when viewed in light of the drawings, in which:

FIGURE 1 is a plan view of a gear train having a combination clutch and brake embodying the herein disclosed invention mounted on a fractional horsepower motor;

FIGURE 2 is a sectional view taken on line 2—2 of FIGURE 1 showing the gear arrangements;

FIGURE 3 is an enlarged sectional view of a combination clutch and brake in a driving attitude taken on line 3—3 of FIGURE 1; and FIGURE 4 is a sectional view of the combination clutch and brake shown in FIGURE 3 but with the clutch shown in a disengaged position.

Referring now to the drawing, a fractional horsepower electric motor, such as that disclosed in patent application Serial No. 701,797, by Ira M. Hurst entitled "Electric Motor," now Patent No. 3,041,487, is generally indicated by numeral 10 and partially shown in outline. The motor has a gear train mechanism or device 12 embodying the instant invention mounted on the shaft end of the motor. The device 12 is mechanically connected to the motor in a driving relation. An electromagnetic relay 14 is mounted on the side of the motor in operable engagement with the gear train mechanism, as will be described hereinafter. The relay 12 may be connected in parallel with the motor, but for faster response the motor is allowed to run continually and the delay energized, or de-energized for output shaft rotation.

The gear train mechanism 12, which is a specific embodiment of the instant invention, includes a supporting frame consisting of an inner plate 16 and an outer plate 18, both of which are generally triangular, and three posts 20 which are riveted to the plates and hold the plates parallel and spaced apart, as may be clearly seen in FIGURES 1 and 2. The base of the device is secured to the shaft end of electric motor 10 by a conventional means.

The electric motor 10 has an output shaft 22 which extends through an opening 24 in the inner plate. The output shaft 22 has a drive pinion 26 fixed on the end thereof, which drive pinion meshes with a drive gear 28 to provide a speed reduction since the drive gear has a larger number of teeth than the pinion 26. The drive gear 28 is press fitted on a gear bushing 30 which is in turn rotatably mounted on a clutch shaft 32. The clutch shaft 32 is rotatably mounted in inner and outer plates 16 and 18, respectively, and is parallel to the output shaft 22.

Bushing 30 is positioned adjacent to the inner plate 16 with a sleeve 34 mounted on the clutch shaft 32 between bushing 30 and plate 16. A first circular sheet metal member 36 is also press fitted on the bushing 30 coaxial of the clutch shaft so that the member 36 rotates with drive gear 28 and is journaled on the clutch shaft. The circular member 36 has a flat circular portion about the center thereof and disposed in abutment with one surface of the drive gear 28. The perimeter of the member has a plurality of outwardly extending pointed identical teeth extending at equal intervals thereabout and disposed at an angle to the plane of the drive gear no greater than a right angle. A second circular sheet metal member 38, which is identical to the first member 36 has a plurality of pointed teeth which mate with the teeth of the first circular member 36. The second circular member 38 is press fitted on one end of a cylindrical actuator 40 for rotation therewith about the clutch shaft 32 with the flat portion normal to the shaft and the teeth extending therefrom toward the teeth of the first circular member. The members 36 and 38 and associated parts from a modified jaw clutch. The actuator 40 includes an integral cylindrical housing 42 which is coaxially journalled about the clutch shaft 32 and supports the member 38. A circular actuator brake flange 44 is formed integral with the end of the housing opposite member 38. In order to provide a driving means for the housing 42, an internal gear with a plurality of teeth is cut axially through the center of the housing, the teeth of the internal gear being parallel to the shaft 32 in the manner of splines. The actuator 40 includes a spring disc 48 which is press fitted into engagement with the internal gear 46 adjacent to member 38 and a helical spring 50 is mounted within the housing in engagement with disc 48. One end of the interior of housing 42 is closed by the disc 48, while the other end is also closed by a gear which serves as a spline 52 which engages the coil spring 50 so that the spring is compressed between the disc 48 and the gear 52. Clutch shaft 32 is press fitted into gear 52 so that the gear 52 rotates with the shaft 32. The gear 52 mates with the internal gear 46 and the housing 42 rotates with shaft 32; however, the housing may slide relative to gear 52 but rotates therewith.

A stop disc 54 of greater diameter than the spline 52 is press fitted onto the shaft 32 adjacent to the spline 52. Thus, the flanged end of housing 42 may slide into engagement with the stop disc 54 and be stopped thereby. At the other end, the axial movement of the housing is limited by bevel gear 36. However, the coil spring 50 reacting between the spline 52 and the spring disc 48 spring biases the flanged end of the housing away from the disc 54 and the two members 36 and 38 in engagement.

A pinion 56 is press fitted on shaft 32 in engagement with the stop disc 54. The pinion 56 in turn meshes with a takeoff gear 58 for a further speed reduction since the pinion 56 has a smaller number of teeth than the meshing takeoff gear. The takeoff gear 58 is fixed to a takeoff shaft 60, which takeoff shaft is rotatably mounted in the outer plate 18 parallel to the shaft 32. The takeoff shaft has a splined end 62 which provides a convenient means for attaching the takeoff shaft to a driven member which is not shown.

The actuator 40 is engageable with a pivotally mounted actuator arm 64 which is bifurcated at one end to form a pair of tangs 65 for frictional engagement with flange 44 of the actuator 40. The end of the arm 64 opposite the bifurcated end has a pair of ears 66 which extend outwardly for reasons which will become apparent hereinafter, and a tab 68 which is integral with the ears 66 and is substantially perpendicular to the ears 66 and arm 64, as may be seen in the drawing. The bifurcated actuator arm is pivotally supported by an integral arm support 70. Arm support 70 includes a base 72 which is riveted to plate 16 and a pair of posts 74 which each have a hook 76 formed therewith. Each of the hooks 76 engage one of the ears 66 and pivotally support the bifurcated arm 64. The tab 68 of the bifurcated arm is engaged by a stem 78 which is an actuating portion of the relay 14. Thus, it is clear that when stem 78 is extended to force inward tab 68, the bifurcated arm pivots about hook 76 to engage the flange 44 thereby compressing spring 50 and disengaging the two members 36 and 38.

The operation of the motor, gear train, clutch and brake assembly may be described as follows. When current is supplied to the electric motor 10, the drive shaft 22 rotates with its pinion 26. The pinion 26, which meshes with drive gear 28 to provide a first speed reduction, turns the drive gear but at a slower speed than the pinion 26. Inasmuch as member 36 is mounted on the same bushing 30 as drive gear 28, the member rotates at the same speed as drive gear 28. When members 36 and 38 are in engagement, the member 38 rotates at the same speed as member 36, and, of course, housing 42 also rotates with member 38. Since gear 52 mates with the internal gear 46, the housing shaft 32 which receives the gear 52, also rotates at the same speed as bushing 30. The shaft 32 has takeoff pinion 56 press fitted thereon, so that the pinion 56 rotates at the same speed as the shaft 32. The takeoff pinion in turn meshes with takeoff gear 58 which is fixed on takeoff shaft 60. It is, of course, clear that there is a speed reduction between the takeoff pinion 56 and takeoff gear 58.

When it is necessary to stop the output of the device, the current is cut off to the electric motor 10 so that the shaft 22 would stop if it were not for inertia. When the current is cut off to the motor 10, the same source of current, which is not shown, also cuts off the current to the relay 14, so that a spring (not shown) in the relay urges the stem 78 toward the shaft 32. The stem 78 engages tab 68 to pivot the actuator arm 64 about the support 70 so that tangs 65 are in frictional engagement with flange 46. The pivoting of arm 64 slides the housing along actuator gear 52 into engagement with disc 54 against the force of coil spring 50 so that cup shaped members 36 and 38 are disengaged. Thus, the motor is disconnected from the takeoff shaft inasmuch as the cup shaped members are disconnected.

After power is cut off, the force between the bifurcated arm 64 and the flange 44 is limited to force exerted by spring 50, and hence the metal to metal contact of the bifurcated arm 64 and flange 44 provides little braking force. During this period the two members 36 and 38 tend to rotate at approximately the same rate, since member 36 is subjected to deceleration of the motor 10 and member 38 is subjected to the relatively slight braking action of the bifurcated arm 64 and flange 44 in opposition to the inertia of the load. Hence, at the moment the cup shaped members 36 and 38 are separated, there is little torque between the members, and the members are not subject to substantial wear. However, once the housing 42 engages the stop disc 54, the force exerted on the flange increases, since coil spring 50 no longer limits this force. The braking action on the takeoff shaft and any driven device attached to the shaft after the housing 42 engages the stop disc 54 by means of the friction developed between the tangs of the bifurcated arm 64 and flange 44, producing extermely rapid stoppage of the driven device.

Many other and additional advantages of this construction will be apparent to those skilled in the art. It is therefore intended that the scope of the present invention be not limited by the foregoing disclosure, but rather only by the appended claims.

The invention claimed is:

1. A clutch and brake assembly comprising, in combination, a base, a clutch shaft rotatably mounted on said base, a first member rotatably journaled about the clutch shaft and a second member translatably and rotatably journaled about the clutch shaft and adapted to engage the first member, said second member having a housing mounted thereon and extending coaxially therefrom on the side thereof remote from the first member, said housing having a cylindrical cross section and a flange extending outwardly therefrom remote from the first member, a spring disposed about the clutch shaft within the housing urging the two members into engagement, a spline having a cylindrical body coaxially disposed about said clutch shaft and secured thereon on the side of the second member opposite the first member, said spline having a plurality of spaced ridges extending from the body thereof, said housing having a coaxial recess therein with spaced parallel grooves therein mating with the ridges of the spline, a disc of larger diameter than the spline mounted coaxially on the clutch shaft adjacent to the spline and on the side therefrom opposite the first member, said spline being restrained from movement along the axis of the shaft and the housing being translatable on the shaft into abutment with the disc, translation of said housing translating the second member from the first member, an actuator arm comprising a flat sheet having a semicircular recess at one end, means for mounting the arm with said end confronting the cylindrical portion of the housing and adapted to abut the flange, said mounting means having a pivotal axis normal to the clutch shaft and spaced from the circular end thereof, and electromechanical means for driving the arm into abutment with the flange of the housing to translate the housing into abutment with the disc against the tension of the spring, whereby the clutch and brake assembly may be mounted on an electric motor and the electromechanical means electrically connected to the electric motor for actaution on deactuation of the electric motor.

2. A clutch and brake assembly for an electric motor comprising the elements of claim 1 in combination with a gear rotatably mounted on said clutch shaft and secured on the first member, said gear being adapted to mesh with a gear mounted on the driving shaft of the electric motor.

3. A clutch and brake assembly for an electric motor comprising the elements of claim 1 wherein the first and second members of the clutch comprise a pair of cup-shaped sheet members having teeth at their peripheries, the peripheries of the cup-shaped sheet members having approximately the same diameter and confronting each other, the teeth of one member being at an angle no greater than a right angle to the confronting teeth of the other member and being adapted to engage the teeth of the other sheet member.

4. An assemblage of an electrical motor, a clutch, and a brake comprising, in combination, an electric motor, a base mounted on the electric motor, a clutch shaft rotatably mounted on said base, a first member rotatably journaled about the clutch shaft and a second member translatably and rotatably journaled about the clutch shaft and adapted to engage the first member, said second member having a housing mounted thereon and extending coaxially therefrom on the side thereof remote from the first member, said housing having a cylindrical cross section and a flange extending outwardly therefrom remote from the first member, a spring disposed about the clutch shaft within the housing urging the two members into engagement, a spline having a cylindrical body coaxially disposed about said clutch shaft and secured thereon on the side of the second member opposite the first member, said spline having a plurality of spaced ridges extending from the body thereof, said housing having a coaxial recess therein with spaced parallel grooves therein mating with the ridges of the spline, a disc of larger diameter than the spline mounted coaxially on the clutch shaft adjacent to the spline and on the side thereof opposite the first member, said spline being restrained from movement along the axis of the shaft and the housing being translatable on the shaft into abutment with the disc, translation of said housing translating the second member from the first member, an actuator arm comprising a flat sheet having a semicircular recess at one end, means for mounting the arm with said end confronting the cylindrical portion of the housing and adapted to abut the flange, said mounting means having a pivotal axis normal to the clutch shaft and spaced from the circular end thereof, the electric motor having an output shaft mechanically coupled to the first member, and electromechanical means electrically connected to the motor for driving the arm into abutment with the flange of the housing to translate the housing into abutment with the disc against the tension of the spring, said electromechanical means being actuated on deactuation of the electric motor.

References Cited by the Examiner
UNITED STATES PATENTS

| | | | |
|---|---|---|---|
| 1,795,733 | 3/1931 | Nelson et al. | 192—18 X |
| 2,189,558 | 2/1940 | Baxter | 192—02 |
| 2,500,956 | 3/1950 | Mershon | 192—02 X |

DAVID J. WILLIAMOWSKY, *Primary Examiner.*